(12) United States Patent
Cutler

(10) Patent No.: US 6,511,263 B2
(45) Date of Patent: Jan. 28, 2003

(54) SYSTEM FOR SPREADING PARTICULATE MATERIALS

(75) Inventor: William Cutler, Plantation, FL (US)

(73) Assignee: Cutler-Malone Industries, Inc., Sunrise, FL (US)

( * ) Notice: Subject to any disclaimer, the term of this patent is extended or adjusted under 35 U.S.C. 154(b) by 0 days.

(21) Appl. No.: 10/041,295

(22) Filed: Jan. 8, 2002

(65) Prior Publication Data

US 2002/0057949 A1 May 16, 2002

Related U.S. Application Data

(63) Continuation-in-part of application No. 09/422,216, filed on Oct. 19, 1999, now Pat. No. 6,343,897.

(51) Int. Cl.$^7$ .............................................. B65G 51/36
(52) U.S. Cl. ......................................................... 406/2
(58) Field of Search ............................ 406/42, 43, 108, 406/109, 122, 143, 145, 146, 157, 164, 194, 196, 2, 12, 77, 101; 239/654

(56) References Cited

U.S. PATENT DOCUMENTS

| | | | |
|---|---|---|---|
| 831,635 A | 9/1906 | Stunce | 406/143 |
| 1,500,966 A | 7/1924 | Supinger | 406/42 |
| 1,943,376 A | 1/1934 | Dilling | 302/42 |
| 2,570,004 A | 2/1951 | Penny | 91/44 |
| 3,007,744 A | 11/1961 | Ward et al. | 302/53 |
| 3,405,514 A | 10/1968 | Pulrang | 59/25.4 |
| 3,567,120 A | 3/1971 | Suda | 239/8 |
| 3,746,217 A | 7/1973 | Hanset et al. | 222/194 |
| 3,899,131 A | 8/1975 | Mester et al. | 239/123 |
| 4,186,885 A | 2/1980 | Christian | 239/654 |
| 4,215,824 A | 8/1980 | Weiste | 239/655 |
| 4,538,941 A | 9/1985 | Thorne | 406/143 |
| 4,630,929 A | * 12/1986 | Medlin | 366/10 |
| 4,709,860 A | 12/1987 | Patrick et al. | 239/654 |
| 4,793,742 A | 12/1988 | Strand | 406/79 |
| 4,815,414 A | 3/1989 | Duffy et al. | 118/308 |
| 4,852,809 A | 8/1989 | Davis et al. | 239/654 |
| 5,018,910 A | 5/1991 | Weiss | 406/144 |
| 5,116,425 A | * 5/1992 | Ruef | 134/17 |
| 5,556,237 A | * 9/1996 | Rexius | 406/32 |
| 5,558,474 A | 9/1996 | Wildon | 406/127 |
| 5,590,984 A | 1/1997 | Assarsson | 406/32 |
| 6,131,830 A | * 10/2000 | Jones | 239/654 |

\* cited by examiner

Primary Examiner—Christopher P. Ellis
Assistant Examiner—Joe Dillon, Jr.
(74) Attorney, Agent, or Firm—Foley & Lardner

(57) ABSTRACT

A system for applying particulate materials comprising a supply source of pressurized gas, a chamber with first and second opposed side walls, at least one pressurized gas entrance conduit for transporting pressurized gas to the chamber, at least one material hopper for depositing particulate material into the chamber, and at least one pressurized gas exit conduit for transporting particulate material away from the chamber. The wand is flexible and is manually controlled so that the user can control the exact direction in which the particulate material is to be focused. The wand includes a switch which sends a signal to a signal-actuated valve which is coupled to the entrance conduit. Upon receiving the appropriate signal, the signal-actuated valve adjusts so as to alter the flow of particulate material. The apparatus is powered by a motor source which maintains an optimum pressure range inside the entrance conduit through the use of a feedback loop operating between the motor source, the compressor, a pressure valve and a throttle. The apparatus is of the appropriate size so as to be mounted on a vehicle.

23 Claims, 8 Drawing Sheets

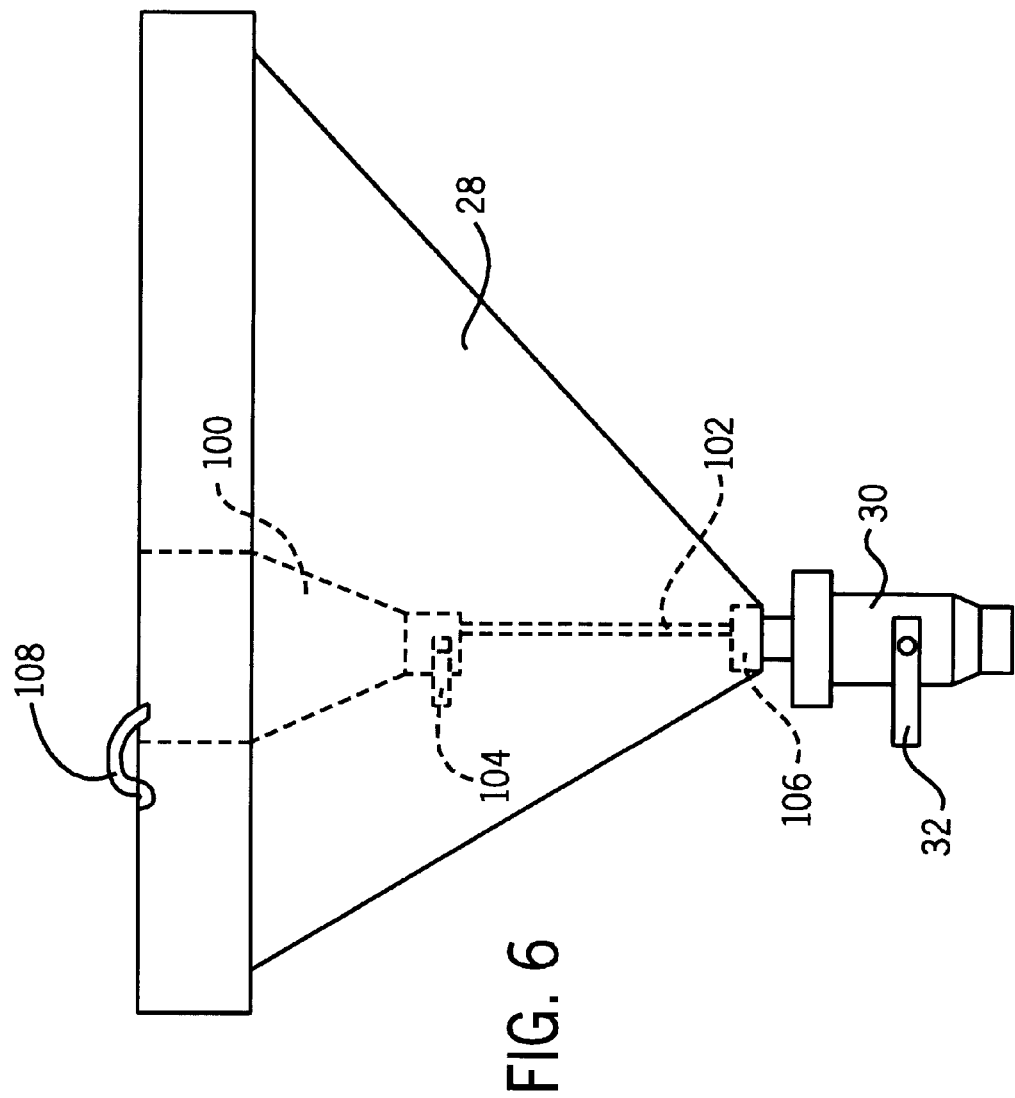

SYSTEM FOR SPREADING PARTICULATE MATERIALS

Figure 1:
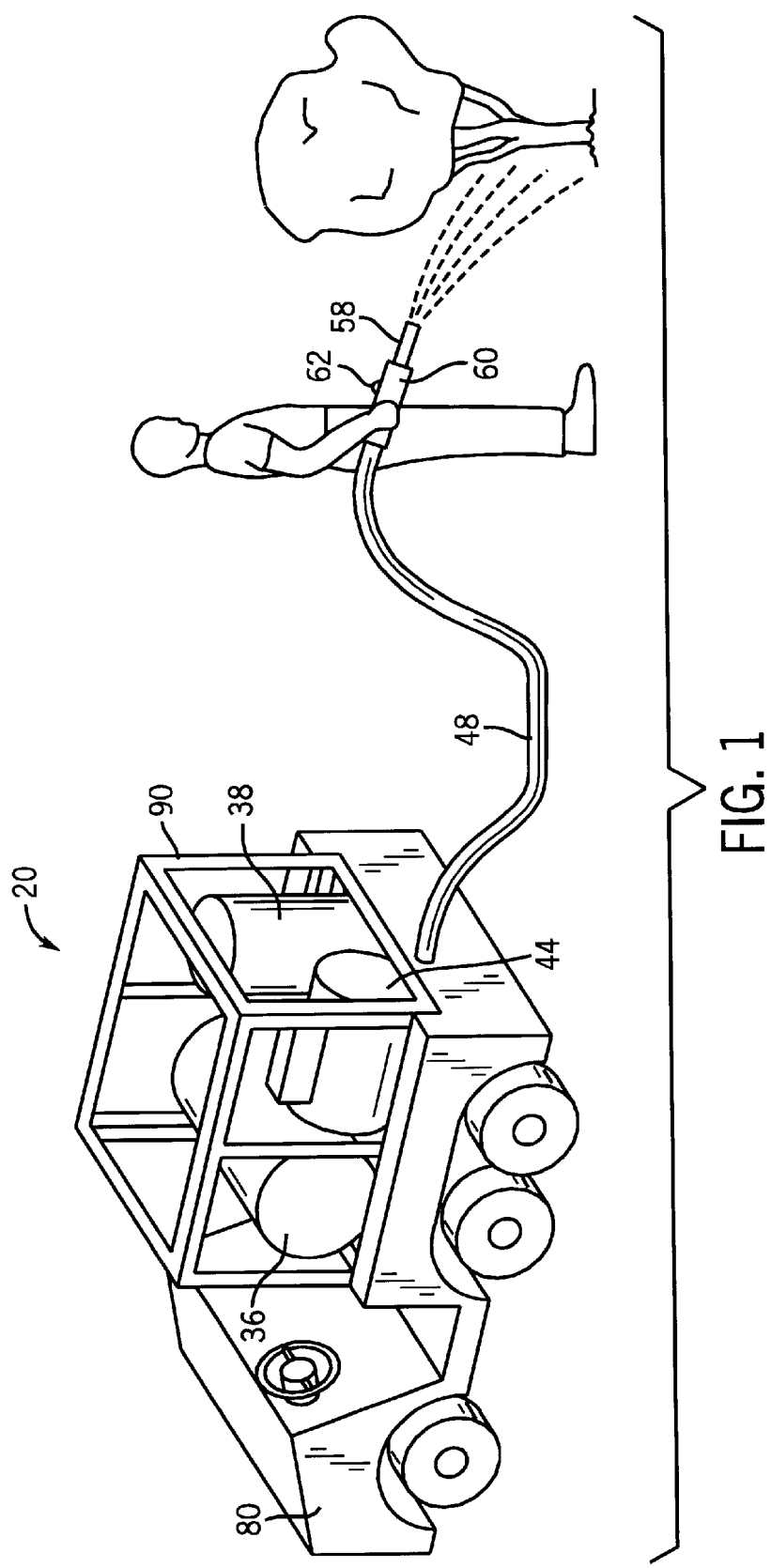

This application is a continuation-in-part of U.S. patent application Ser. No. 09/422,216, filed on Oct. 19, 1999 now patented as U.S. Pat. No. 6,343,897.

TECHNICAL FIELD

This invention relates generally to systems for spreading particulate materials. More particularly, this invention relates to a system for spreading particular amounts of particulate materials in an even manner across different surfaces.

BACKGROUND OF THE INVENTION

There are several devices currently known to the landscaping industry which perform an effective job of distributing particulate materials across open spaces such as grass fields. One such device comprises a hopper with a rotary vane attached underneath that can spread particulate materials in all directions as the hopper is pushed forward or backward. Although such devices are adequate for wide-open spaces, they have several shortcomings in other situations. For example, there is often a need to spread fertilizer, pesticides, or other materials along the underside of shrubbery or garden plants. Because concentrated fertilizer can be corrosive and can damage plant tissue because of chemical burning, there is a need for a way to uniformly apply fertilizer below the leaves of the plants while avoiding placing any fertilizer on top of the leaves. Because common hopper-type spreaders cannot perform this task adequately, landscape maintenance workers often have to perform this task by hand by dipping a cup or other container into a hopper or bag and then distribute the material by hand to the underside of the shrubbery. This process can be very cumbersome and time-consuming, and it is very difficult to guarantee that the particulate materials are evenly distributed over the intended surfaces. When a worker uses this process, some areas will often get no particulate material at all, while other areas will get too much material. Additionally, if the worker is not careful or is in a hurry, fertilizer could accidentally be thrown onto the leaves of the plant, causing serious damage to the plant. Finally, distributing the fertilizer by hand can cause the worker to accidentally spill material upon himself, which can create an unprofessional image of the worker or pose health risks depending upon the composition of the fertilizer.

Similar problems exist for other particulate materials. For example, it is often desirable to evenly distribute grass seed in corners or hard-to-reach areas of a plot of land. Additionally, it can also be important to distribute salt or urea on icy and snowy pavement or sidewalk during the winter months. Although there are several products currently on the market that perform an adequate job of distributing these materials along roads, these devices often have a difficult time reaching non-flat, paved areas such as steps or corners. If the salt or urea is not adequately distributed on such surfaces, portions of the surfaces can remain icy and slippery and could result in serious harm to someone who walks on the surfaces. As in the case of the landscape maintenance worker, people often spread the materials by hand to reach difficult places. But this can be very time-consuming and it is difficult to ensure that the material is evenly spread across the surfaces.

There are still other areas where there is a need for evenly spreading particulate materials while maintaining precise control of where the materials are deposited. For example, golf course maintenance personnel often need to spread dry sand in sand traps and other areas. In these situations, a user's options are often quite limited in how they can efficiently and adequately spread the materials in an even manner.

It is also important that a person who is spreading particulate materials can do so over a large area quickly and efficiently. In the case of a large plot of land, a worker must often spread particulate materials in many different locations in hard to reach areas.

There have been attempts to develop systems for spreading particulate materials in an even manner, but each has its drawbacks. In particular, several devices use a combination of a rotary vane and a blower motor to power the spreader through a large boom. Blower motors are an inefficient means of forcing air at a velocity sufficient to force the particulate materials out of the boom, however, and such systems would require air hoses with a diameter of about two to four inches. These devices can also be so large and heavy that they must be mounted in the bed of a compact pick-up truck in order to be transported. Furthermore, the exit channels on many of these devices are fixed in position relative to the rest of the device and have a limited range direction when spreading the materials.

SUMMARY OF THE INVENTION

It is therefore an object of this invention to provide an improved system for spreading particulate materials across surfaces in an evenly-distributed manner.

It is another object of this invention to provide an improved system for spreading particulate materials in which the user can precisely control the direction in which the materials are spread.

It is another object of this invention to provide a system for spreading particulate materials that can be adapted to spread materials of different densities and particle sizes.

It is yet another object of this invention to provide a vehicle-mounted system for spreading particulate materials.

It is yet another object of this invention to provide an system for spreading particulate materials that can spread the materials in more than one direction at one time.

It is yet another object of this invention to provide a system for applying particulate materials wherein the user has the ability to quickly activate or discontinue the flow of the particulate material.

It is yet another object of this invention to provide a system for spreading particulate materials wherein the amount of material that is distributed can be quickly adjusted.

It is yet another object of this invention to provide a system for spreading particulate materials wherein the system can make adjustments to ensure that a constant amount of material is being distributed over time.

It is still another object of this invention to provide a system for spreading particulate materials wherein the apparatus can be easily operated.

To obtain the above-described objects, one aspect of this invention provides for a particulate spreader comprising an engine which supplies energy to a compressor. The compressor compresses air or other compressible fluid in a pressurized supply source, and the pressurized gas flows from the supply source into a chamber or metering block through a pressurized gas entrance conduit. At the same time, particulate material from a material hopper is deposited into the metering block. The particulate material is carried or entrained by the pressurized gas into an exit conduit, preferably in the form of a flexible hose with a wand at the end thereof. Both the air flow and the flow of particulate material can be modified by manually adjusting a series of valves. The preferred engine-compressor combination includes a feedback loop for maintaining the air pressure within a certain range. A user holds the exit conduit at a handle and points the wand in the appropriate direction and activates a switch in the handle for starting the flow of gaseous material to the metering block, spreading the particulate material in the desired location. The user also operates the switch when it is desired to stop the spreading operation by discontinuing the flow of air into the metering block. The switch and valve can also be modified to maintain a partial flow of air into the metering block.

According to another aspect of the invention, one engine and one compressor are used to supply compressed air to two separate metering blocks. Each metering block has an exit conduit connected to it so that particulate materials can be spread in multiple directions at one time.

These and other objects, advantages, and features of the invention, together with the organization and manner of operation thereof, will become apparent from the following detailed description when taken in conjunction with the accompanying drawings, wherein like elements have like characters throughout the drawings described below.

BRIEF DESCRIPTION OF THE DRAWINGS

FIG. 1 is an isometric view of apparatus for spreading particulate materials;

FIG. 2 is a side view of the apparatus shown in FIG. 1, more particularly showing the components that make up the mixing and distribution of the particulate materials;

FIG. 3 is a side view of the metering block in conformance with one embodiment of the invention;

FIG. 4 is a pneumatic and electrical system diagram of the flow of the pressurized gas from the air tank to the metering block and the electrical circuit for actuating the system by using the handle-mounted switch;

FIG. 5*a* is a side view of a system for spreading particulate materials wherein material can be spread in multiple directions;

FIG. 5*b* is a side view of an alternate system for spreading particulate materials wherein material can be spread in multiple directions;

FIG. 6 is a side view of an alternative embodiment of the invention wherein two concentrically-positioned material hoppers are used to spread different types of materials, a second and internally-disposed one of the hoppers being shown in phantom; and FIG. 7 is a sectional side view of a metering assembly according to an alternate embodiment of the invention.

DETAILED DESCRIPTION OF THE INVENTION

As can be seen in FIGS. 1 and 2, a particulate spreader indicated generally at 20 comprises a chamber or metering block 22 with a pressurized gas entrance conduit 24 and an exit conduit 26 connected thereto. A material hopper 28 is located generally above the metering block 22 and includes a passage 30 that runs from the bottom of the material hopper 28 to the top of the metering block 22. Preferably, the passage 30 is gravity-fed with particulate material from the material hopper 28. In one embodiment of the invention, the channel 30 includes a valve 32 for adjusting the amount of particulate or particulate material that enters the metering block 22. In a most preferred embodiment of the invention, the valve 32 on the channel 30 is a standard ball valve.

Referring to FIG. 3, the air entrance conduit 24 includes an air nozzle 54 which protrudes through a first wall 34 of the metering block 22 by a predetermined distance d. In a preferred embodiment of the invention, the nozzle 54 has an exit diameter 55 of about one-eighth of an inch. As shown in FIG. 4, the pressurized gas entrance conduit 24 runs from the metering block 22 back to an air tank 36. In the illustrated embodiment of the invention, the pressurized gas entrance conduit 24 is in the form of an air hose and has a diameter of about three-eighths of an inch. The air inside the air tank 36 and the pressurized gas entrance conduit 24 is compressed by a compressor 38 which is connected to the air tank 36 by an air supply line 40. Also connecting the compressor 38 to the air tank 36 is a second pressure line 98. Communicating with the air tank 36 on the entrance conduit 24 is a regulator 42, which is connected to the air tank 36 via an intermediary conduit 96. Communicating between the compressor 38 and the air tank 36 is an unloader 92. A pressure gauge 94 is also attached to the air tank 36 so that a user can visually monitor the air pressure inside the air tank 36. The unloader 92 is preset for a standard operating range. The compressor 38 is connected by a transmission link 43 to a prime mover such as a motor or a preferably gasoline-driven internal combustion engine 44. The engine 44 can be the same as the engine used by a vehicle upon which the spreader 20 is mounted (FIG. 1), or the engine 44 can be dedicated to supply power to the spreader 20 alone. A throttle 46 is coupled to the engine 44. The compressor 38 and the engine 44 are connected to each other by a first pressure line 70 and by the transmission link 43 which is used by the engine 44 to supply power to the compressor 38. The power transmission link drive train 43 can take the form of a drive shaft, belt, a hydraulic line, gearing, or a more complicated transmission.

Referring to FIGS. 2 and 3, the exit conduit 26 is in the form of a flexible hose 48. The hose 48 is connected to the metering block 22 by a hose disconnect 50 at a second wall 52 of the chamber. The hose 48 can be any of several lengths and preferably has a diameter of about one inch. The length of hose 48 is selected to be long enough for a user on foot to use it comfortably, supposing that the spreader 20 is mounted on a vehicle, but not so long that significant reductions of pressure and velocity result. The user can also employ the flexible hose while riding in or driving the vehicle. A wand 58 terminates the hose 48, and can be pointed in virtually any direction by the user in order to precisely direct the flow of particulate materials to the areas where they are wanted. A handle 60 is mounted on the hose 48 near its end and includes an electrical switch 62 for adjusting the air flow in the spreader 20.

As seen in FIG. 4, the switch 62 is electrically connected to an electrically-actuated valve 64 which is coupled to the entrance conduit 24. The switch 62 is capable of being placed in at least two positions. In the illustrated embodiment of the invention, the electrically-actuated valve 64 is in the form of a solenoid valve which can either completely open or close the entrance conduit 24, either permitting or restricting the movement of air to the metering block 22. In an alternative embodiment of the invention, the electrically-actuated valve can have three or more positions such that when the position of the switch 62 is adjusted, a signal is sent to the electrically-actuated valve 64, which in turn adjusts its position to either permit more or less air to pass through the entrance conduit 24. The switch 62 selectively connects the electrically-actuated valve 64 to a battery 68. In a preferred embodiment of the invention, the battery 68 is capable of producing a current of about three amperes at twelve volts DC.

Figure 4:
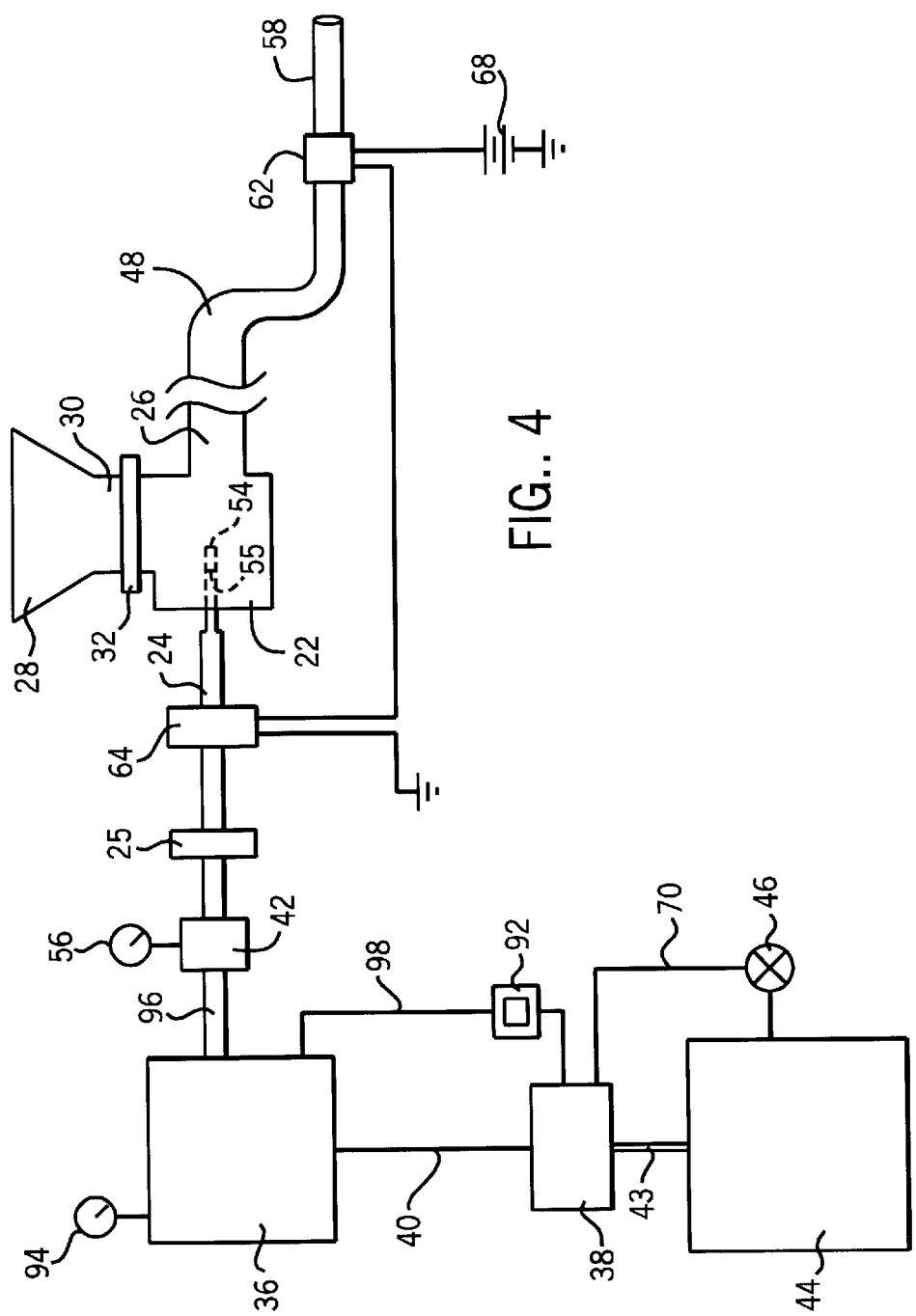

The air flow to the metering block 22 can also be manually controlled by adjusting a ball valve 25 (FIGS. 2 and 4) located along the pressurized gas entrance conduit 24. In one embodiment of the invention, the ball valve 25 acts as an emergency shut-off for the spreader 20.

The operation of the spreader is as follows. The engine 44 is used to power the compressor 38. The compressor 38 works to compress the air inside the air tank 36. In order to adequately operate the electrically-actuated valve 64 (when, as preferred, it is a solenoid valve), the compressor 38 should compress the air in the air entrance conduit 24 to about fifty pounds per square inch. In a preferred embodiment of the invention, the pressure in the air entrance conduit 24 is regulated to be in the range of sixty to ninety pounds per square inch.

In order to maintain the appropriate pressure in the air entrance conduit 24 at this range, the pressure generated in the air tank should remain in the range of about 100 to 115 pounds per square inch. To maintain the pressure in this range, the pressure gauge 56 and the unloader 92 monitor the air pressure. When the pressure exceeds about 115 pounds per square inch in the pressure gauge 56, the unloader 92 closes the first pressure line 70 running between the compressor 38 and the engine 44. The closure of the first pressure line 70 results in a closing of the throttle 46. The closing of the throttle 46 powers down the engine 44, in one embodiment of the invention, preventing the compressor 38 from forcing additional air into the air tank 36. Similarly, when the pressure in the air tank falls below about 80 pounds per square inch, in one embodiment of the invention, this will be sensed by the pressure gauge 56, giving the user a visual indication of the pressure. The unloader 92 opens the first pressure line 70 running between the compressor 38 and the energize 44. This also opens the throttle 46 (FIG. 2), which powers up the engine 44. Additional power is then applied to the compressor 38 in order to increase the pressure in the air tank 36.

Figure 2:
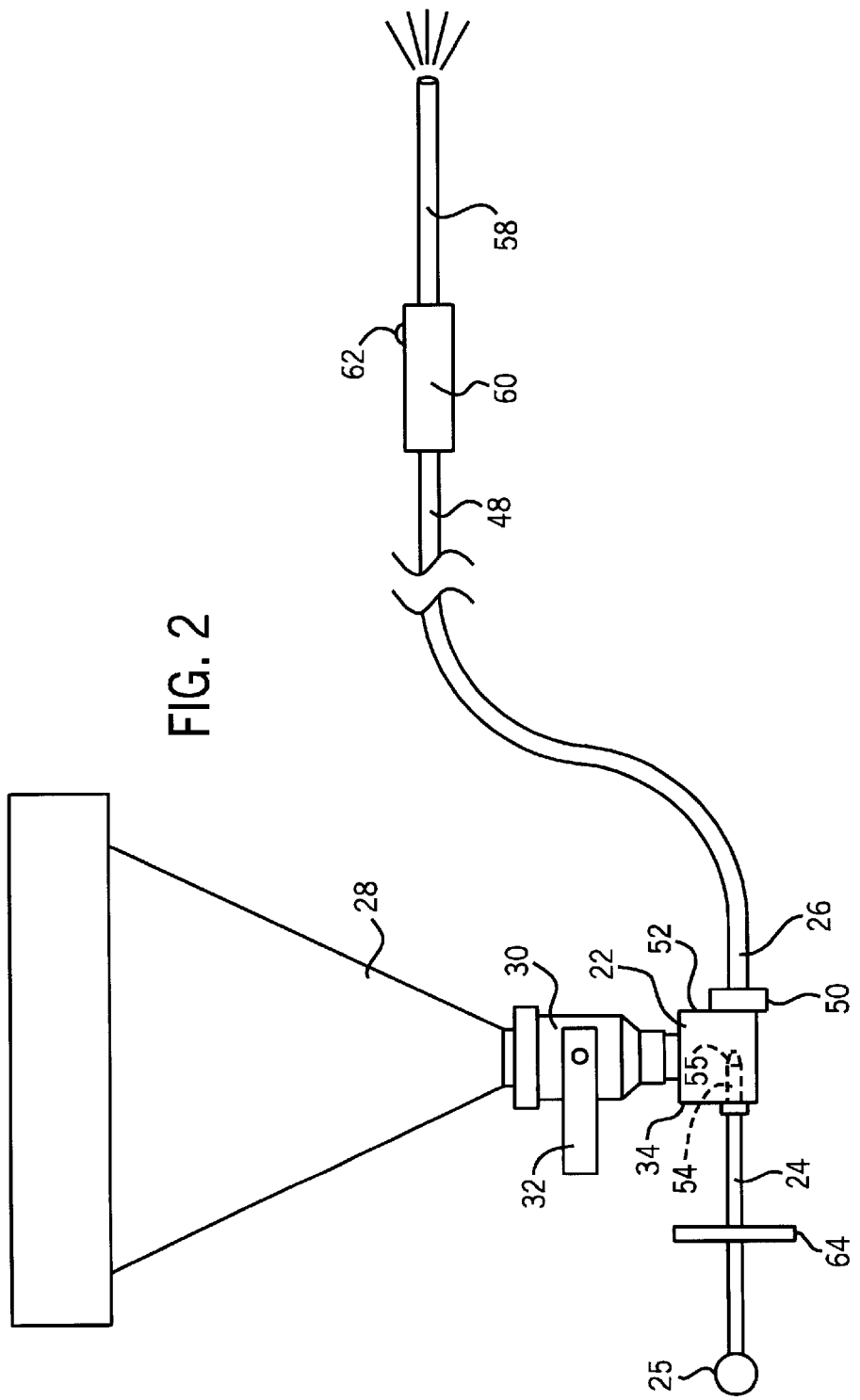
Figure 3:
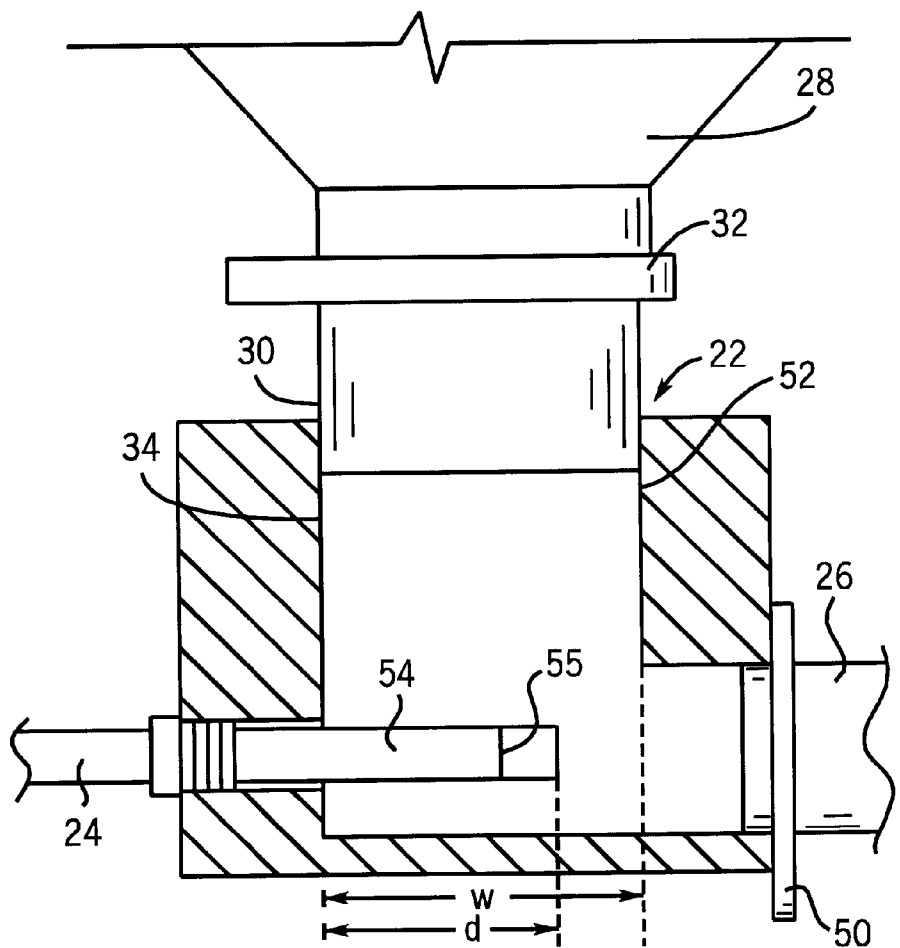

Referring in particular to FIGS. 2 and 3, when the air inside the air tank 36 is under the appropriate pressure and the ball valve 25 is at least partially open, compressed air is forced into the metering block 22. By opening the valve 32 between the material hopper 28 and the metering block 22, particulate material is permitted to fall into the metering block 22. In preferred embodiment of this invention, the particulate material can be salt, sand, fertilizer, pesticide, herbicide, urea, or grass or other seed, although other materials are possible so long as the materials are not so thick or sticky as to clog up the inside of the channel 30 or the metering block 22. One advantage of the invention is that the air pressure and particulate feed flow can be adjusted for different particulate or particulate materials. The density and therefore the fluid-entrainment characteristics will vary greatly among these various kinds of solid particulates; less air mass is needed to push grass seed than, for example, quartzite sand. As the particulate material falls into the metering block 22, it carried by the air stream flowing out of the nozzle 54 into the exit conduit 26.

In order to ensure to that substantially all of the particulate material is transported into the exit conduit 26, the location of the end of the nozzle 54 relative to the second wall 52 is important. Preferably, the open end of the nozzle 54 should be positioned at a distance d which is between one-half and three-fourths of the width w, taken between the first wall 34 and the second wall 52. In a most preferred embodiment of the invention, the end of the nozzle 54 is positioned about five-eighths of the way across the metering block 22 to the second wall 52. In one preferred embodiment of the invention, the distance from the first wall 34 to the second wall 52 is about 2.2 inches. The end of the nozzle 54 is substantially coaxial with the exit conduit 26.

As the particulate or granular materials interact with the air stream coming from the nozzle 54, they are transported through the hose 48 to the wand 58. The user holds the wand 58 by the handle 60 and points the wand 58 in the desired direction. When the switch 62 is in a position in which at least some air is flowing through the entrance conduit 24, the particulate materials will be forced out of the wand 58 and the particulate materials will be spread in the desired direction. In a preferred embodiment of the invention where fertilizer is used as the particulate material, between about six and a half and seventeen pounds of material should be spread per minute, although this amount can be easily adjusted by adjusting the regulator 42, the valve 32 below the material hopper, or adjusting the switch 62 on the handle 60 if the switch 62 has more than two positions. For example and in one embodiment of the invention, between about six and a half and twenty-four pounds of material would be spread per minute when using a six foot hose. The exact flow rate of particulate materials can also vary depending on the diameter of the entrance and exit conduits 24 and 26, the size and geometry of the metering chamber 22, and the density of the material being spread.

Figure 5A:
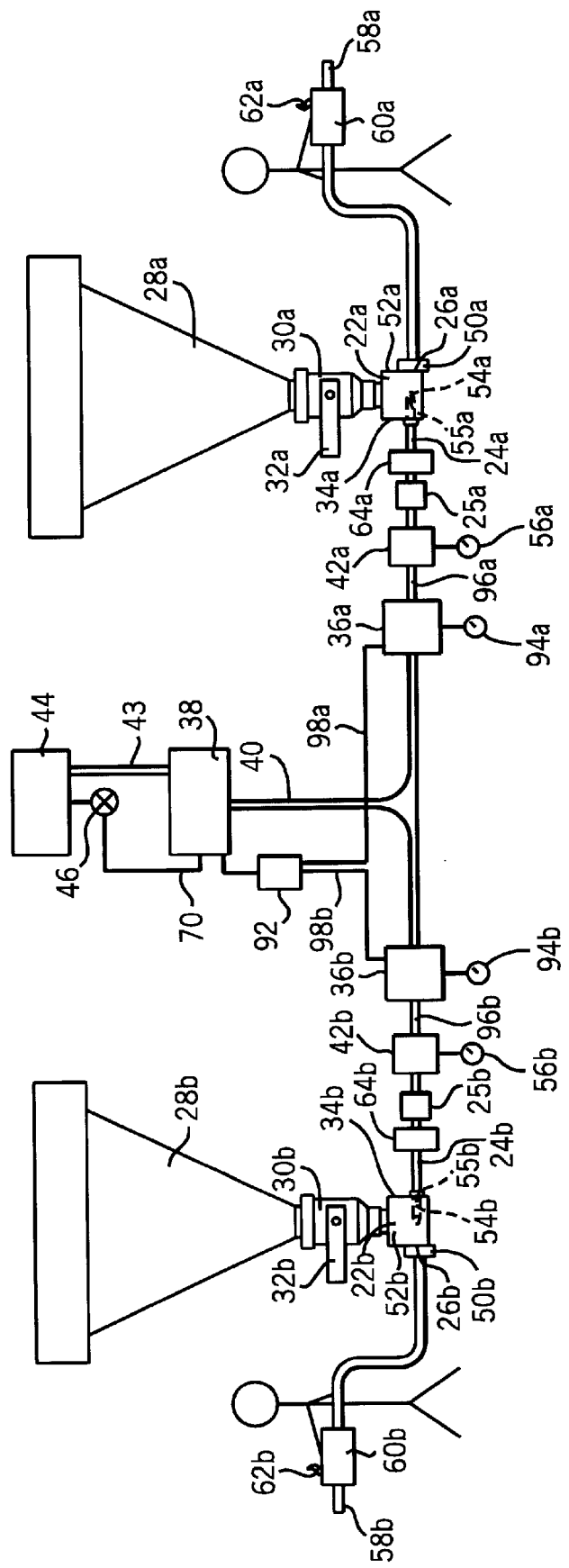
Figure 5B:
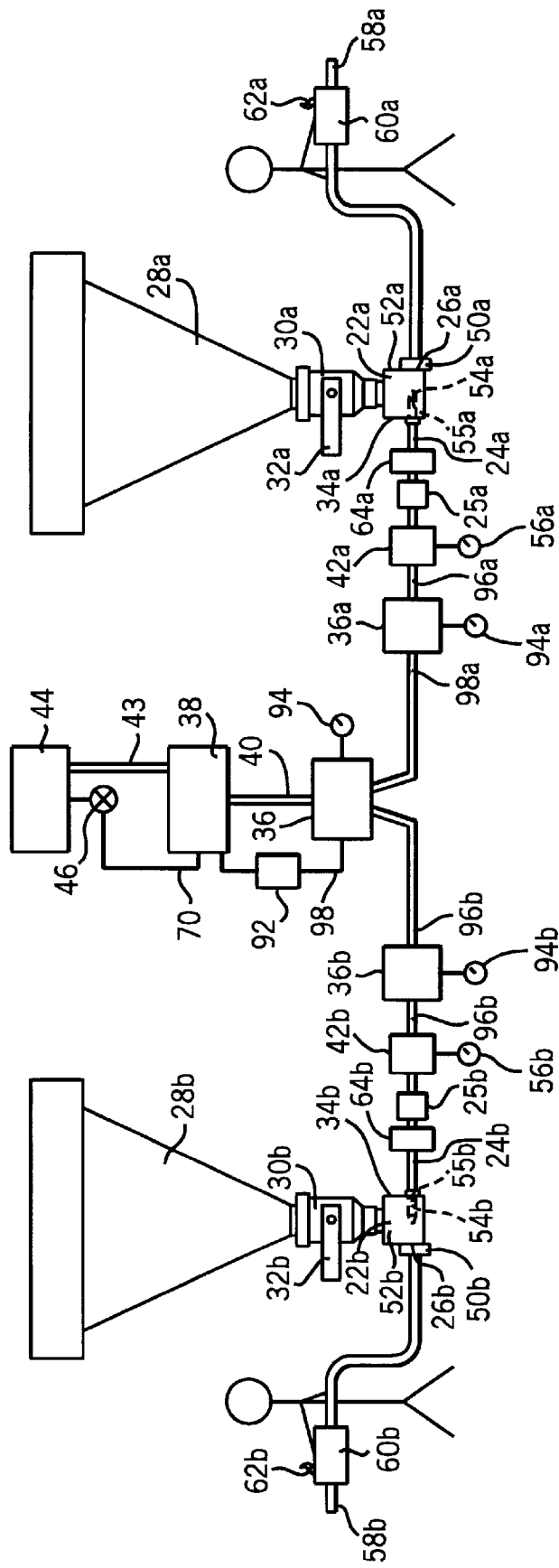

In another embodiment of the invention, the spreader 20 can be altered so that more than one person can use it at one time. As shown in FIG. 5a, the compressor 38 can be used to supply compressed gas to two metering blocks 22a,b. In one embodiment of the invention, each air line 40 is connected to its own air tank 36, although it is also possible to have one air tank 36 supply air for two air entrance conduits 24 as shown in FIG. 5b. Where there two air tanks 36a and 36b, a pressurized gas entrance conduit 24a,b connects each air tank 36a,b to separate metering blocks 22a,b, with material hoppers 28a,b located above respective metering blocks 22a,b. Each metering block 22a,b has an exit conduit 26a,b leading away from it towards a respective wand 58a,b. In this manner, two users may use separate wands 58a,b so as to be able to spread the material in different directions. In a preferred embodiment of the invention, a compressor which produces more cubic feet of gaseous material per minute would be used.

In a second alternative embodiment of the invention as shown in FIG. 6, a second material hopper 100 can be placed inside the primary material hopper 28. The second material hopper 28 is connected to the primary hopper 28 by a hook 108 or other mechanical means that are well-known to those skilled in the art such as bolts or latches. The second hopper 100 is coupled to a flexible line 102 which runs to the bottom of the primary hopper 28. An additional ball valve 104 is coupled to the line 102 for adjusting, the flow of material from the second hopper 100. Attached to the base of the primary hopper 28 and the line 102 is a fitting 106 which allows material from both hoppers 28 and 100 to enter the passage 30 leading to the metering block 22. Depending upon the particular system requirements, the material can flow from both hoppers 28 and 100 simultaneously, or the ball valve 104 could be of the type that permits material to flow from only one of the hoppers 28 and 100 at a time. Due to the smaller dimensions of the second hopper 100 and the line 102, it is preferable that very light materials such as seed or insecticide be used in the second hopper 100, although other materials may be possible.

In yet another embodiment of the invention as shown in FIG. 1, the spreader 20 includes all of its essential components arranged inside a frame 90 that is of proper size so as to be able to be placed in the back of a vehicle 80 such as a low-bed pickup. Several such "Truckster" vehicles, such as a John Deere Gator, a Toro Utility Vehicle, a Cushman Utility Vehicle, a Kawasaki Mule, or a Haulmaster are all capable of having the frame 90 of the particulate spreader stored thereon. By having the hose 48 be of a sufficient length, the user is capable of directing the wand 58 to spread particulate material while still keeping the vehicle 80 in motion. Additionally, it is also possible to have the particulate spreader 20 mounted on a trailer to be towed by a motorized vehicle. The user(s) may apply particulate material while seated in or even while driving the vehicle, or the user may stand near the vehicle while spraying the material.

Figure 7:
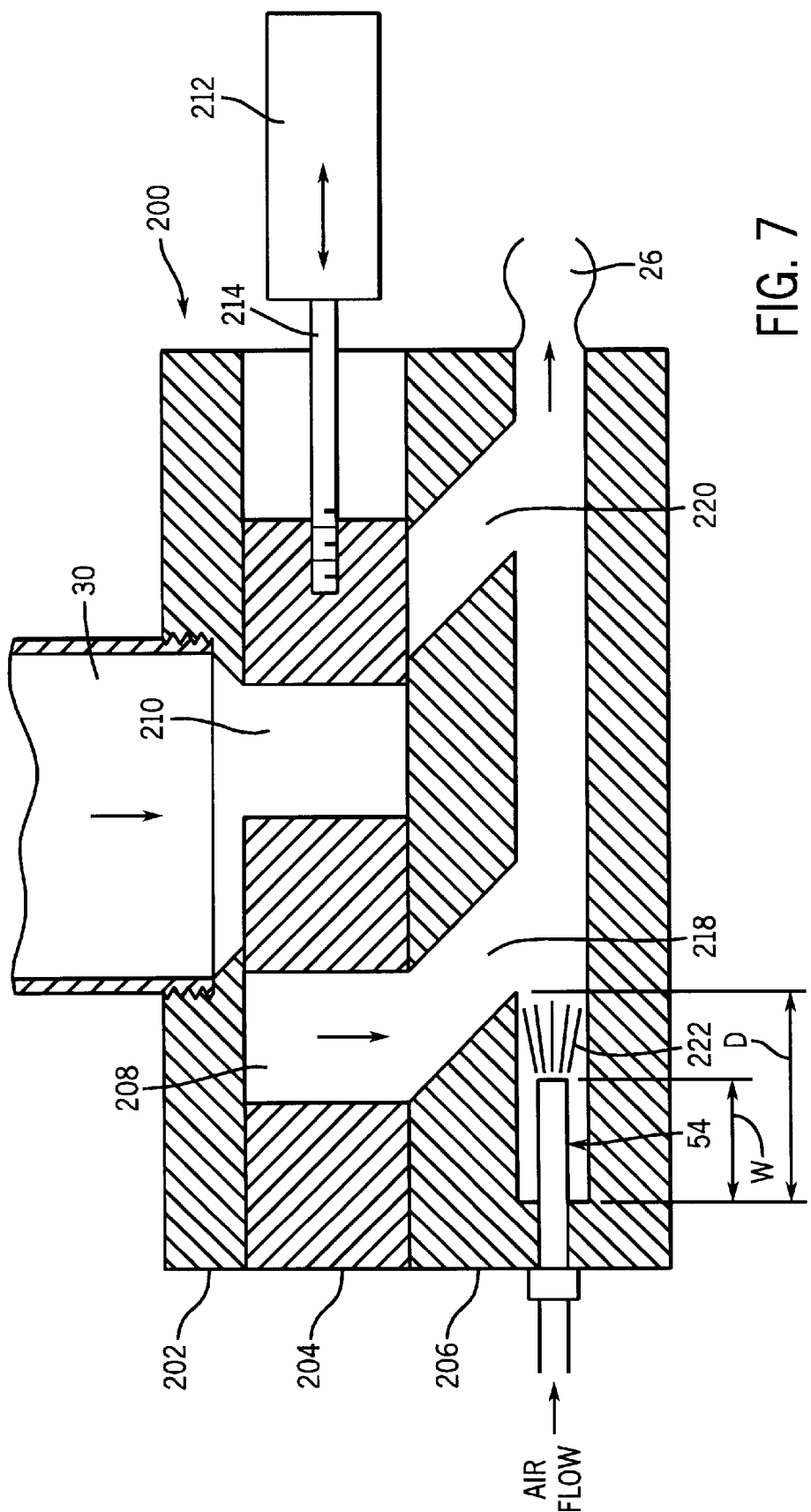

Another embodiment of the invention is shown in FIG. 7, in which an alternative metering assembly, shown generally at 200, is used to meter precise quantities of material for spreading. The metering assembly 200 comprises a first section 202, a second section 204 and a third section 206. The first section 202 and the third section 206 are maintained in a substantially constant position relative to the passage 30. The second section 204, however, is movable between first and second positions. In one embodiment of the invention, an actuator 212 is coupled to the second section 204 by an actuator arm 214. The second section 204 includes a first storage area 208 and a second storage area 210.

When the second section 204 is moved into a first position, shown in FIG. 7, the second storage area 210 is located directly beneath the passage 30. This positioning permits the second storage area 210 to fill with a specific amount of material to be spread. At the same time, if the first storage area 208 had previously been filled with material, then the material in the first storage area 208 falls through a first storage conduit 218 to be entrained by the stream of air emanating from the nozzle 54, forcing the material into the exit conduit 26. After the second storage area 210 is filled with material, the actuator 212 moves the second section to a second position (not shown), in which the material from the second storage area is entrained by the stream of air from the nozzle after the material passes through a second storage conduit 220. At the same time, the first storage area 208 is positioned beneath the passage 30 so that the first storage area 208 may be filled with material.

In the embodiment shown in FIG. 7, the nozzle 54 is positioned within a nozzle chamber 222 such that the nozzle 54 extends a length w between about five-eighths to about three-quarters of the distance d from one end of the nozzle chamber to the point at which the first storage conduit 218 begins.

The arrangement described in FIG. 7 permits the user to meter a specific, controlled amount of material for application, ranging from about one quarter of a teaspoon to much larger quantities. In one preferred embodiment of the invention, the second section 204 is replaceable such that exact quantity of material to be metered can change depending upon the user's particular requirements.

While several preferred embodiments have been shown and described, it is understood that changes and modifications can be made to the invention without departing from the invention's broader aspects. For example, instead of using two material hoppers for an apparatus that comprises two hoses for spreading the particulate materials, the apparatus could use one large hopper which is connected to both metering blocks. Also, the metering block can have the shape of a cylinder, wherein the first and second walls mentioned in the specification would each represent a portion of the inner cylindrical wall of the block. Additionally, it is possible to use fluids other than pressurized air to transport the particulate materials through the exit conduit. Instead of relying on a dedicated engine, the prime mover of the pump could be a vehicle engine with power obtained from a belt, shaft, or hydraulic line, and a different power/pressurized air regulation scheme. Finally, it is feasible that frozen materials such as very fine-grained snow or ice could be spread using this apparatus. Thus, it is apparent that alternative embodiments are available to those skilled in the relevant art. Therefore, the present invention is not limited to the described and illustrated embodiments but only by the scope and spirit of the appended claims.

What is claimed is:

1. A particulate material spreader, comprising:

a reservoir of pressurized gas;

a compressor coupled to the reservoir;

a chamber for receiving pressurized gas and particulate material;

an entrance conduit for delivering pressurized gas from the reservoir to the chamber, said entrance conduit having an end protruding into said chamber;

at least one material hopper, the material hopper having at least one opening located generally above the chamber for having particulate material transported therethrough, said end below said at least one opening of said at least one material hopper; and an exit conduit for having particulate material transported away from the chamber, wherein the compressor compresses the pressurized gas located in the reservoir, the resulting compressed pressurized gas being capable of transporting particulate material through the exit conduit.

2. The apparatus of claim 1, further comprising an internal combustion engine coupled to the compressor for providing power to the compressor.

3. The apparatus of claim 2, further comprising a pressure gauge coupled to the reservoir of pressurized gas.

4. The apparatus of claim 2, wherein the apparatus is mounted on a vehicle.

5. The apparatus of claim 2, wherein the internal combustion engine is a gasoline engine.

6. The apparatus of claim 5, wherein the compressor has an unloader connected to the gasoline engine by a pressure line, such that when the pressure in the reservoir falls below a predetermined pressure, the corresponding reduction in pressure inside the pressure line causes the unloader to open the pressure line which opens a throttle coupled to the engine, causing the engine to increase its power output to the compressor.

7. The apparatus of claim 5, wherein the gasoline engine is connected to the compressor by a pressure line such that when the pressure in the reservoir exceeds about 115 pounds per square inch, the corresponding increase in pressure inside the pressure line causes the unloader to close the vacuum inside the pressure line which closes the throttle and causes the engine to reduce its power output to the compressor.

8. Apparatus for applying particulate materials, comprising:
- a pressurized gas supply source;
- a chamber for receiving pressurized gas and particulate material;
- an entrance conduit for transporting pressurized gas having a first end and a second end, the first end connected to the supply source of pressurized gas, the second end protruding through the first side wall of the chamber at least one material hopper having at least one opening located generally above the chamber for having particulate material transported therethrough, said second end below said at least one opening of said at least one material hopper; to be located within the chamber;
- a signal-activated valve located along the entrance conduit between the first end and the second end for adjusting the flow of pressurized gas through the conduit;
- a flexible, manually-held hose having a first end and a second end, the first end being joined to the second side wall of the chamber for having particulate materials exit therethrough, the second end of the hose being located outside the chamber; and
- a switch mounted on the hose near the second end of the hose for activating the signal-activated valve,
- wherein the activation of the switch sends an electrical signal to the signal-activated valve which proceeds to adjust the gaseous flow through the conduit.

9. The apparatus of claim 8, wherein the signal-activated valve can be adjusted to an open position and a closed position.

10. The apparatus of claim 8, wherein the signal-activated valve comprises a solenoid valve.

11. The apparatus of claim 8, wherein the signal-activated valve can be adjusted to an open position, a closed position, and at least one partially closed position.

12. The apparatus of claim 8, further comprising a metering assembly between the at least one material hopper and the chamber, the metering assembly including:
- an actuator assembly; and
- a metering block coupled to the actuator assembly, the metering block having multiple compartments, each of which can be alternately positioned beneath the at least one material hopper.

13. A material spreader, comprising:
- presurized a gaseous source;
- a chamber with first and second opposed side walls;
- an entrance conduit for transporting gaseous material from the gaseous source and having a first end connected to the gaseous source and a second end opening on the chamber, the second end protruding through the first side wall of the chamber to be located within the chamber;
- a material hopper having at least one opening located generally above the chamber for having particulate material transported into the chamber, said second end below said at least one opening of said at least one material hopper;
- an exit conduit for transporting gaseous material and particulate materials away from the chamber, the exit conduit having a first end and a second end, the first end of the exit conduit opening onto the chamber second side wall for having particulate materials exit therethrough,
- a valve coupled to the entrance conduit; and
- a switch mounted on the exit conduit, the switch capable of sending an indication to the valve for the purpose of adjusting the flow of gaseous material,
- wherein the distance between the second end of the entrance conduit and the second side wall of the chamber is between about one-half and about three-quarters of the distance from the first side wall of the chamber and the second side wall of the chamber.

14. The material spreader of claim 13, wherein the distance between the second end of the entrance conduit and the second side wall of the chamber is about five-eighths of the distance from the first side wall and the second side wall of the chamber.

15. A vehicle-mounted particulate material spreader, comprising:
- a supply source of pressurized gas;
- a chamber with first and second opposed side walls;
- a pressurized gas entrance conduit for transporting pressurized gas and having a first end connected to the supply source of pressurized gas and a second end opening on the chamber, the second end protruding through the first side wall of the chamber to be located within the chamber;
- at least one material hopper, the material hopper having at least one opening located generally above the chamber, for having particulate material transported into the chamber said second end below said at least one opening of said at least one material hopper; and
- a manually-controlled exit conduit for transporting pressurized gas and particulate materials away from the chamber, the exit conduit having a first end and a second end, the first end opening onto the chamber second side wall for having particulate materials exit therethrough,
- a signal-activated valve coupled to the entrance conduit; and
- a manually-operated switch mounted on the exit conduit, the switch capable of sending a signal to the signal-activated valve for the purpose of adjusting the flow of pressurized gas.

16. The spreader according to claim 15, further comprising:
- a compressor coupled to the supply source;
- an unloader coupled to the compressor;
- a pressure line running from the supply source to the compressor;
- an internal-combustion engine for delivering energy to the compressor;
- a pressure line running from the internal-combustion engine to the compressor; and
- a throttle coupled to the internal-combustion engine;
- wherein when the pressure in the supply source falls below about 100 pounds per square inch, the corresponding reduction in pressure inside the pressure line causes the unloader to open the pressure line, resulting in an opening the throttle, causing the engine to increase its power output to the compressor.

17. The spreader according to claim 15, further comprising:
- a compressor coupled to the supply source;
- an unloader coupled to the compressor;
- a pressure line running from the supply source to the compressor;
- an internal-combustion engine for delivering energy to the compressor;

a pressure line ruining from the internal-combustion engine to the compressor; and a throttle coupled to the internal-combustion engine;

wherein when the pressure in the supply source exceeds about 115 pounds per square inch, the increase in pressure inside the pressure line causes the unloader to close the pressure line, resulting in an closing of the throttle which causes the engine to decrease its power output to the compressor.

18. The spreader according to claim 15, wherein the signal-activated valve comprises a solenoid valve.

19. The spreader according to claim 15, further comprising:

a second chamber with first and second opposed side walls;

a second entrance conduit for transporting pressurized gas having a first end and a second end, the first end connected to the supply source of pressurized gas, the second end opening on the second chamber; and a second exit conduit connected to the second chamber for having particulate materials and pressurized gas exit therethrough.

20. The spreader according to claim 15, further comprising a valve located between the at least one material hopper and the chamber for adjusting the amount of particulate material that is delivered to the chamber.

21. The spreader according to claim 15 further comprising a regulator coupled to the entrance conduit for regulating the flow of pressurized gas to the chamber.

22. The spreader according to claim 15, wherein the distance between the second end of the entrance conduit and the first end of the exit conduit is between about one-half and about three-quarters of the distance from the first side wall to the second side wall of the chamber, such that when particulate material is deposited into the chamber, the particulate material is entrained through the exit conduit by a stream of pressurized gas.

23. The spreader according to claim 22, wherein the distance between the second end of the entrance conduit and the first end of the wand is about five-eighths of the distance from the first side wall to the second side wall of the chamber.

* * * * *